(12) United States Patent
Takita et al.

(10) Patent No.: US 6,610,778 B2
(45) Date of Patent: Aug. 26, 2003

(54) FLUOROSILICONE RUBBER COMPOSITIONS

(75) Inventors: Kenichi Takita, Gunma-ken (JP); Kunihiko Mita, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 52 days.

(21) Appl. No.: 09/942,655

(22) Filed: Aug. 31, 2001

(65) Prior Publication Data
US 2002/0061953 A1 May 23, 2002

(30) Foreign Application Priority Data
Aug. 31, 2000 (JP) ........................................ 2000-262046

(51) Int. Cl.$^7$ ............................................... C08L 83/07
(52) U.S. Cl. ........................... 524/588; 528/42; 528/24; 525/479; 525/474; 560/302; 556/458; 544/221; 549/215; 524/492
(58) Field of Search ...................... 528/42, 24; 525/479, 525/474; 560/302; 556/458; 544/221; 549/215; 524/492, 588

(56) References Cited

U.S. PATENT DOCUMENTS 6,369,155 B1 * 4/2002 Takita

FOREIGN PATENT DOCUMENTS

| JP | A62124148 | 6/1987 |
| JP | 62174260 A | 7/1987 |

* cited by examiner

*Primary Examiner*—Robert Dawson
*Assistant Examiner*—Kuo-Liang Peng
(74) *Attorney, Agent, or Firm*—Birch, Stewart, Kolasch & Birch, LLP

(57) ABSTRACT

In a fluorosilicone rubber composition comprising (A) an organopolysiloxane having trifluoropropyl and (B) a silica filler, there are included (C) an organic peroxide of percarbonate type as a crosslinking agent and (D) a compound having a molecular weight of up to 10,000 and bearing in a molecule at least two substituents selected from among allyl, acryloyl, methacryloyl, epoxy and alkoxy groups as a co-crosslinking agent, whereby the vulcanization molding time is substantially reduced without detracting from physical properties.

11 Claims, No Drawings

FLUOROSILICONE RUBBER COMPOSITIONS

This invention relates to fluorosilicone rubber compositions, and more particularly, to fluorosilicone rubber compositions which can be briefly molded and vulcanized into products having improved swell resistance upon immersion in fuel oil and lubricating oil as well as satisfactory compression recovery and mechanical strength.

BACKGROUND OF THE INVENTION

Because of heat resistance, freeze resistance, oil resistance, fuel oil resistance, and compression recovery, fluorosilicone rubber is widely used as parts for automobiles, aircraft and other transporting vehicles and parts for petroleum-related equipment.

Fluorosilicone rubber compositions can be molded and vulcanized as are dimethylsilicone rubber compositions. Usually, a fluorosilicone rubber composition is molded into any desired shape by a conventional rubber molding technique such as compression molding, transfer molding, injection molding, extrusion molding or calender molding and then vulcanized and cured by a conventional technique. In this way, rubber parts such as O-rings, diaphragms and gaskets are obtained. The predominant molding method involves molding to the desired shape by applying heat and pressure in a mold as in compression molding, transfer molding and injection molding, followed by vulcanization curing. The vulcanization curing may use prior art well-known organic peroxides as in dimethylsilicone rubber compositions, and most often, 2,5-dimethyl-2,5-di(tert-butylperoxy)hexane and dicumyl peroxide are employed.

For reducing the manufacturing cost of rubber parts, a number of studies have been made how to reduce the vulcanization curing time. In the process of applying heat and pressure within a mold, the manufacturing cost can be reduced by reducing the vulcanization curing time to increase the turnover of the mold.

As compared with dimethylsilicone rubber compositions, the fluorosilicone rubber compositions are slow in vulcanization curing and require a long time for vulcanization curing. If the vulcanization curing time is short, the desired crosslinking density is not reached. This results in shortage of hardness, shortage of strength, and poor heat resistance and still worse, the compression set and oil swell which are important as sealing material are also exacerbated.

Vulcanization curing can be accelerated by increasing the amount of organic peroxide used as the vulcanizing or curing agent. However, even if the organic peroxide is increased beyond the appropriate level, the crosslinking density is no longer increased. Also the molded parts are rather exacerbated in compression set, heat resistance and oil resistance under the influence of the excess of organic peroxide and decomposed residues thereof.

Use of an organic peroxide having a lower decomposition temperature is also under consideration with the aim to accelerate vulcanization curing at the same molding temperature. For dimethylsilicone rubber compositions, the vulcanization curing time can be reduced using peroxy ketal organic peroxides such as 1,1-bis(tert-butylperoxy)-3,3,5-trimethylcyclohexane or percarbonate organic peroxides such as 1,6-bis(tert-butylperoxycarbonyl-oxy)hexane. For fluorosilicone rubber compositions, similar vulcanization curing gives rise to problems that the rubber physical properties are poor as compared with vulcanization curing with customary peroxides such as 2,5-dimethyl-2,5-di(tert-butylperoxy)hexane and dicumyl peroxide, and that vulcanization curing is so fast that the rubber composition has been cured before it fully flows and fills in the mold, resulting in molded parts of undesired shape.

Raising the vulcanization curing temperature is an effective measure for reducing the vulcanization curing time because decomposition of the organic peroxide is promoted. At the elevated temperature, however, vulcanization curing is so fast that the rubber composition has been cured before it fully flows and fills in the mold. This often gives rise to problems that the molded parts have undesired shape, are distorted, discolored or unevenly colored, and seized to the mold.

For dimethylsilicone rubber compositions, the vulcanization curing time can also be reduced by vulcanizing the compositions through addition reaction using platinum base catalysts. This is not effective or practical to most fluorosilicone rubber compositions because little vulcanization proceeds with these catalysts.

SUMMARY OF THE INVENTION

An object of the invention is to provide fluorosilicone rubber compositions which are significantly reduced in vulcanization molding time.

The invention is directed to a fluorosilicone rubber composition comprising an organopolysiloxane having a trifluoropropyl group and a silica filler. It has been found that the time required for the composition to complete vulcanization molding can be significantly reduced without detracting from its physical properties when an organic peroxide of percarbonate type is used as a crosslinking agent and concurrently, a compound having a molecular weight of up to 10,000 and bearing in a molecule at least two substituents selected from among allyl, acryloyl, methacryloyl, epoxy and alkoxy groups, at least one of the substituents being selected from among allyl, acryloyl, methacryloyl and epoxy groups, is used as a co-crosslinking agent.

The invention provides a fluorosilicone rubber composition comprising (A) 100 parts by weight of an organopolysiloxane represented by the following average compositional formula (1):

wherein $R^1$ is trifluoropropyl, $R^2$ is a substituted or unsubstituted, monovalent, aliphatic unsaturated hydrocarbon group having 2 to 8 carbon atoms, $R^3$ is an unsubstituted, monovalent, aliphatic saturated hydrocarbon or aromatic hydrocarbon group having 1 to 8 carbon atoms, "a" is a positive number of 0.96 to 1.01, "b" is a positive number of 0.0001 to 0.01, "c" is a positive number of 0.96 to 1.06, and the sum of a+b+c is 1.98 to 2.02, and having a viscosity of at least 10,000 cs at 25° C., (B) 5 to 100 parts by weight of a silica filler, (C) 0.01 to 5 parts by weight of an organic peroxide of the following general formula (2) or (3):

wherein each of $R^4$ and $R^5$, which are the same or different, is a monovalent hydrocarbon group having 3 to 10 carbon atoms,

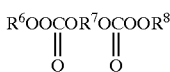

wherein each of $R^6$ and $R^8$, which are the same or different, is a monovalent hydrocarbon group having 3 to 10 carbon atoms, and $R^7$ is a divalent hydrocarbon group of 2 to 8 carbon atoms which may contain an oxygen atom, and (D) 0.01 to 2 parts by weight of a co-crosslinking agent having a molecular weight of up to 10,000 and bearing in a molecule at least two substituents selected from the class consisting of allyl, acryloyl, methacryloyl, epoxy and alkoxy groups, at least one of the substituents being selected from the class consisting of allyl, acryloyl, methacryloyl and epoxy groups.

DESCRIPTION OF THE PREFERRED EMBODIMENT

Component (A) of the fluorosilicone rubber composition according to the invention is an organopolysiloxane represented by the following average compositional formula (1).

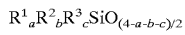

Herein $R^1$ is trifluoropropyl. $R^2$ stands for substituted or unsubstituted monovalent aliphatic unsaturated hydrocarbon groups of 2 to 8 carbon atoms, for example, alkenyl groups such as vinyl, allyl, propenyl, butenyl and hexenyl. $R^3$ stands for unsubstituted, monovalent, aliphatic saturated hydrocarbon or aromatic hydrocarbon groups of 1 to 8 carbon atoms, for example, alkyl groups such as methyl, ethyl, propyl, butyl and hexyl, aryl groups such as phenyl and tolyl, and aralkyl groups such as benzyl. Letter "a" is a positive number of 0.96 to 1.01, "b" is a positive number of 0.0001 to 0.01, "c" is a positive number of 0.96 to 1.06, and a+b+c is 1.98 to 2.02.

The organopolysiloxane of formula (1) should have at least two aliphatic unsaturated hydrocarbon groups represented by $R^2$ in a molecule while $R^2$ may be located at the ends of the backbone and/or on side chains.

The organopolysiloxane should have a viscosity of at least 10,000 centistokes (cs) at 25° C., preferably 100,000 to 100,000,000 cs at 25° C., so that the silicone rubber obtained by curing the composition may have a high strength. Most preferably, the organopolysiloxane is gum-like.

The organopolysiloxane of the general formula (1) can be prepared, for example, by effecting ring-opening polymerization of tri(trifluoropropyl)trimethylcyclo-trisiloxane using a siloxane oligomer shown below as an initiator, as disclosed in JP-A 62-174260.

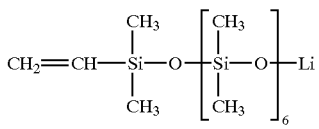

Component (B) is a silica filler. For a practically acceptable mechanical strength, the silica filler should preferably have a specific surface area of at least 50 m²/g, and more preferably 100 to 400 m²/g as measured by the BET method. Exemplary silica fillers are fumed silica, fired silica and precipitated silica, alone or in admixture of two or more. These silica fillers may be surface treated with surface treating agents such as chain organopolysiloxanes, cyclic organopolysiloxanes, organochlorosilanes, and hexamethyldisilazane.

An appropriate amount of the silica filler (B) blended is 5 to 100 parts, preferably 10 to 50 parts by weight per 100 parts by weight of the organopolysiloxane (A). Outside the range, the composition becomes less workable and cures into a product having unsatisfactory mechanical strength such as tensile strength or tear strength.

Component (C) is an organic peroxide of the following general formula (2) or (3).

Herein, $R^4$ and $R^5$, which are the same or different, stand for monovalent hydrocarbon groups having 3 to 10 carbon atoms, for example, alkyl groups such as propyl, n-butyl, tert-butyl, and 2-ethylhexyl, alkenyl groups such as allyl, aryl groups such as phenyl and tolyl, and substituted groups in which some or all of the hydrogen atoms attached to carbon atoms in the foregoing groups are substituted with halogen atoms or cyano groups, such as chloropropyl and 3,3,3-trifluoropropyl.

$R^6$ and $R^8$, which are the same or different, stand for monovalent hydrocarbon groups having 3 to 10 carbon atoms, for example, alkyl groups such as propyl, n-butyl, tert-butyl, and 2-ethylhexyl, aryl groups such as phenyl and tolyl, and substituted groups in which some or all of the hydrogen atoms attached to carbon atoms in the foregoing groups are substituted with halogen atoms or cyano groups, such as chloropropyl and 3,3,3-trifluoropropyl.

$R^7$ stands for divalent hydrocarbon groups of 2 to 8 carbon atoms which may contain an oxygen atom, for example, alkylene groups such as ethylene and hexamethylene and oxygen atom-bearing alkylene groups such as —(CH$_2$)$_2$—O—(CH$_2$)$_2$—.

Preferred examples of the organic peroxide (C) are represented by the following structural formulae. They may be used alone or in admixture of two or more.

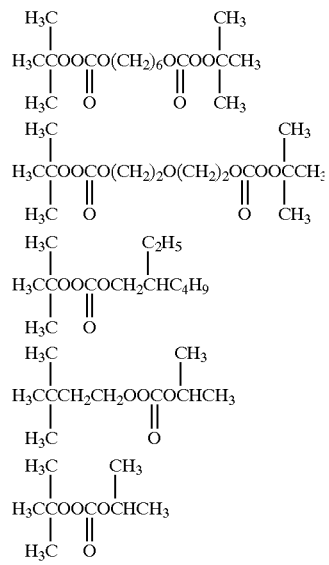

As compared with customary peroxides used in vulcanization molding entailing the application of heat and pressure in a mold, such as 2,5-dimethyl-2,5-di(tert-butylperoxy)hexane and dicumyl peroxide, these organic peroxides (C)

have a low decomposition temperature and are thus able to accelerate vulcanization curing at the same molding temperature.

An appropriate amount of the organic peroxide (C) is 0.01 to 5 parts, preferably 0.2 to 2 parts by weight per 100 parts by weight of the organopolysiloxane (A). With too little an amount of the organic peroxide, the desired crosslinking density is not reached, resulting in shortage of hardness, shortage of strength, poor compression set, poor heat resistance and increased oil swell. With too large an amount of the organic peroxide, the molded parts are exacerbated in compression set, heat resistance and oil resistance under the influence of the excess of organic peroxide and decomposed residues thereof.

It is acceptable to use well-known organic peroxide customarily used for vulcanization curing of silicone rubber, for example, di-tert-butyl peroxide, dicumyl peroxide, 1,1-bis(tert-butylperoxy)-3,3,5-trimethyl-cyclohexane, 2,5-dimethyl-2,5-di(tert-butylperoxy)hexane, and 2,5-dimethyl-2,5-di(tert-butylperoxy)hexane, if desired for improving the surface vulcanized state of molded part and for improving rubber physical properties including compression set, heat resistance and oil resistance. In this embodiment, the additional organic peroxide is preferably blended in an amount of up to 3 parts, especially up to 1 part by weight per 100 parts by weight of the organopolysiloxane (A).

Component (D) is a co-crosslinking agent which when combined with the organic peroxide (C), presents crosslinking sites upon vulcanization curing, thereby accomplishing a practically satisfactory crosslinking density.

The co-crosslinking agent (D) is a compound having a molecular weight of up to 10,000 and bearing in a molecule at least two substituents selected from among allyl, acryloyl, methacryloyl, epoxy and alkoxy groups, at least one of the substituents being selected from among allyl, acryloyl, methacryloyl and epoxy groups. Preferred among others are compounds having in a molecule at least two substituents selected from among allyl, acryloyl, methacryloyl and epoxy groups; and compounds having in a molecule at least one alkoxy group and at least one substituent selected from among allyl, acryloyl, methacryloyl and epoxy groups.

Of the former compounds, those having at least two allyl or methacryloyl groups in a molecule are more preferred. Examples of the compounds having at least two allyl groups include triallyl isocyanurate, triallyl isocyanurate-modified organopolysiloxane as represented by the following formulae, and tetraallyl pyromellitate.

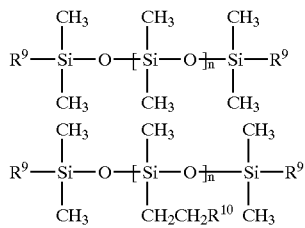

In the formulae, R⁹ is a monovalent organic group of the following formula:

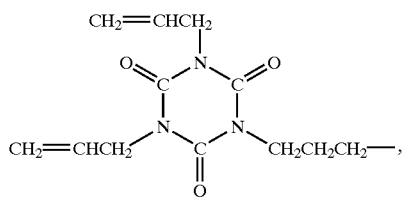

$R^{10}$ is a perfluoroalkyl group of 1 to 12 carbon atoms, and "n" is such a number as to give a molecular weight of up to 10,000. Examples of the compounds having at least two methacryloyl groups include ethylene glycol dimethacrylate and trimethylol propane trimethacrylate.

The latter compounds include those having at least one alkoxy group and at least one other substituent group, such as methacryloyloxypropyl trimethoxysilane, allyl triethoxysilane, and glycidoxypropyl trimethoxysilane.

It is noted that the substituent groups may be the same or different in the co-crosslinking agent molecule. Alternatively, two or more co-crosslinking agents may be used together.

An appropriate amount of the co-crosslinking agent (D) is 0.01 to 2 parts by weight per 100 parts by weight of the organopolysiloxane (A). With too little an amount of the co-crosslinking agent, the desired crosslinking density is not reached, resulting in shortage of hardness, shortage of strength, poor compression set, and increased oil swell. Too large an amount of the co-crosslinking agent results in too high a crosslinking density so that the vulcanized rubber is brittle and loses rubber elasticity, and causes the vulcanized rubber to stick to the mold during molding, depending on the identity of the co-crosslinking agent.

In addition to the essential components described above, the composition of the invention may contain other optional components. Such optional components include dispersing aids, for example, silanol-terminated siloxanes having a degree of polymerization of up to 100, silanol-containing silanes, alkoxy-containing silanes, and hexaalkyldisilazanes; inorganic fillers (other than the silica filler (B)) such as diatomaceous earth, quartz flour, fused quartz powder, clay, alumina, and talc; heat resistance/oil resistance modifiers such as red iron oxide, zinc oxide, titanium oxide, cerium oxide, zinc carbonate, magnesium carbonate, and magnesium oxide; coloring pigments such as carbon black and ultramarine; parting agents; and many other additives commonly added to conventional fluorosilicone rubber compositions. Depending on a particular application, appropriate additives are selected and added in conventional amounts.

The fluorosilicone rubber composition thus obtained can be molded into a desired shape by applying heat and pressure in a mold as by compression molding, transfer molding and injection molding, followed by vulcanization curing. Molded rubber parts are obtained in this way. Vulcanization curing is usually effected at about 150 to 190° C. for about 3 to 30 minutes.

There has been described a fluorosilicone rubber composition in which an organic peroxide of percarbonate type is used as a crosslinking agent and in conjunction therewith, a compound having a molecular weight of up to 10,000 and bearing in a molecule at least two substituents selected from among allyl, acryloyl, methacryloyl, epoxy and alkoxy groups, at least one of the substituents being selected from among allyl, acryloyl, methacryloyl and epoxy groups, is used as a co-crosslinking agent, whereby the vulcanization molding time is substantially reduced without detracting from its physical properties.

EXAMPLE

Examples of the invention are given below by way of illustration and not by way of limitation. All parts are by weight.

A fluorosilicone rubber compound was prepared according to the following procedure.

Fluorosilicone Rubber Compound A

Fluorosilicone rubber compound A was prepared by adding 30 parts of fumed silica (Aerosil 200 by Nippon Aerosil Co. Ltd.), 35 parts of quartz flour (Crystallite VXS by Tatsumori Co., Ltd.) and 3 parts of diphenylsilane diol as a dispersant to 100 parts of an organopolysiloxane A represented by the following formula, uniformly mixing them, heat treating the blend at 150° C. for 4 hours, and masticating the blend on a twin-roll mill for plasticization.

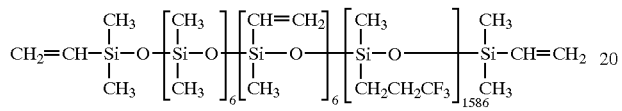

Examples 1–6 & Comparative Examples 1–3

Nine compositions were prepared by blending the above-prepared fluorosilicone rubber compound A with an organic peroxide as shown in Table 1 and a co-crosslinking agent in a proportion as shown in Table 2 and milling them on a twin-roll mill. Each composition was examined for vulcanization behavior at 165° C. using a Rheometer MDR2000 by Japan Monsanto Co., Ltd. The time required for vulcanization curing is represented by T90 (the time taken until the torque increases to 90% of the final torque). Separately, a sheet of 2 mm thick was formed from each composition by compression molding at 165° C. for 10 minutes. On the sheet, tests were conducted for examining initial physical properties, heat resistance and fuel oil resistance. The results are shown in Table 2.

TABLE 1

| | Structural formula |
|---|---|
| Organic peroxide 1 | $\begin{array}{c} \text{H}_3\text{C} \quad\quad\quad\quad\quad\quad \text{CH}_3 \\ | \quad\quad\quad\quad\quad\quad\quad | \\ \text{H}_3\text{CCOOCO(CH}_2)_6\text{OCOOCCH}_3 \\ | \quad\; \| \quad\quad\quad\quad \| \quad\; | \\ \text{H}_3\text{C} \quad \text{O} \quad\quad\quad \text{O} \quad \text{CH}_3 \end{array}$ |
| Organic peroxide 2 | $\begin{array}{c} \text{H}_3\text{C} \quad\quad\quad \text{C}_2\text{H}_5 \\ | \quad\quad\quad\quad | \\ \text{H}_3\text{CCOOCOCH}_2\text{CHC}_4\text{H}_9 \\ | \quad\; \| \\ \text{H}_3\text{C} \quad \text{O} \end{array}$ |
| Organic peroxide 3 | $\begin{array}{c} \text{H}_3\text{C} \quad \text{CH}_3 \quad \text{CH}_3 \; \text{CH}_3 \\ | \quad\quad | \quad\quad\quad | \quad\quad | \\ \text{H}_3\text{CCOOC(CH}_2)_2\text{COOCCH}_3 \\ | \quad\quad | \quad\quad\quad | \quad\quad | \\ \text{H}_3\text{C} \quad \text{CH}_3 \quad \text{CH}_3 \; \text{CH}_3 \end{array}$ |

TABLE 2

| Component (pbw) | CE1 | CE2 | E1 | E2 | E3 | CE3 | E4 | E5 | E6 |
|---|---|---|---|---|---|---|---|---|---|
| Fluorosilicone rubber compound A | 100 | 100 | 100 | 100 | 100 | 100 | 100 | 100 | 100 |
| Triallyl isocyanurate | | | 0.2 | 0.4 | 0.4 | 3.0 | | | |
| Tetraallyl pyromellitate | | | | | | | 0.2 | | |
| Trimethylolpropane trimethacrylate | | | | | | | | 0.2 | |
| Methacryloyloxypropyl trimethoxysilane | | | | | | | | | 0.2 |
| Organic peroxide 1 | | 0.8 | 0.6 | 0.6 | | 0.6 | 0.6 | 0.6 | 0.6 |
| Organic peroxide 2 | | | | | 0.8 | | | | |
| Organic peroxide 3 | 0.6 | | | | | | | | |
| Vulcanization behavior | | | | | | | | | |
| $T_{90}$ (sec) | 266 | 153 | 94 | 85 | 83 | 60 | 68 | 81 | 63 |
| Initial physical properties | | | | | | | | | |
| Hardness (Durometer A) | 71 | 59 | 69 | 73 | 70 | 89 | 69 | 67 | 69 |
| Tensile strength (MPa) | 7.6 | 6.9 | 6.7 | 6.8 | 7.5 | 5.0 | 7.5 | 7.6 | 8.4 |
| Elongation at break (%) | 173 | 395 | 210 | 175 | 245 | 10 | 230 | 280 | 217 |
| Compression set @ 180° C./22 hr (%) | 25 | 48 | | 17 | 21 | unmeasurable | | | |
| Heat resistance @ 200° C./70 hr | | | | | | | | | |
| Hardness change (point) | +3 | +7 | | +3 | +4 | unmeasurable | | | |
| Tensile strength change (%) | −7 | −16 | | +1.2 | −8 | unmeasurable | | | |
| Elongation change (%) | −5 | −26 | | ±0 | −5 | unmeasurable | | | |
| Fuel oil resistance @ 23° C./22 hr in Fuel B | | | | | | | | | |
| Volume change (%) | +18 | +20 | +18 | +18 | +19 | +16 | +18 | +19 | +18 |

It is seen from Table 2 that as compared with the sample using conventional 2,5-dimethyl-2,5-di(tert-butylperoxy) hexane, the cured silicone rubber samples obtained by vulcanization curing silicone rubber compositions within the scope of the invention exhibited equivalent physical properties and took a short time for vulcanization curing. Improved productivity was confirmed.

When the peroxide of percarbonate type was used alone, vulcanization was accelerated, but the desired crosslinking density was not reached. Shortage of hardness, poor compression set and poor heat resistance were observed. When the triallyl isocyanurate co-crosslinking agent was used in excess, the crosslinking density was too high, and so the vulcanized rubber was hard and brittle and failed to exhibit rubbery elasticity.

Japanese Patent Application No. 2000-262046 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A fluorosilicone rubber composition comprising
   (A) 100 parts by weight of an organopolysiloxane represented by the following average compositional formula (1):

   (1)

wherein $R^1$ is trifluoropropyl, $R^2$ is a substituted or unsubstituted, monovalent, aliphatic unsaturated hydrocarbon group having 2 to 8 carbon atoms, $R^3$ is an unsubstituted, monovalent, aliphatic saturated hydrocarbon or aromatic hydrocarbon group having 1 to 8 carbon atoms, "a" is a positive number of 0.96 to 1.01, "b" is a positive number of 0.0001 to 0.01, "c" is a positive number of 0.96 to 1.06, and the sum of a+b+c is 1.98 to 2.02, and having a viscosity of at least 10,000 cs at 25° C.,
   (B) 5 to 100 parts by weight of a silica filler,
   (C) 0.01 to 5 parts by weight of an organic peroxide of the following general formula (2) or (3):

   (2)

wherein each of $R^4$ and $R^5$, which are the same or different, is a monovalent hydrocarbon group having 3 to 10 carbon atoms,

   (3)

wherein each of $R^6$ and $R^8$, which are the same or different, is a monovalent hydrocarbon group having 3 to 10 carbon atoms, and $R^7$ is a divalent hydrocarbon group of 2 to 8 carbon atoms which may contain an oxygen atom, and
   (D) 0.01 to 2 parts by weight of a co-crosslinking agent having a molecular weight of up to 10,000 and bearing in a molecule at least two substituents selected from the group consisting of allyl, acryloyl, methacryloyl, epoxy and alkoxy groups, at least one of the substituents being selected from the group consisting of allyl, acryloyl, methacryloyl and epoxy groups.

2. The fluorosilicone rubber composition of claim 1 wherein said organic peroxide has the formula (4):

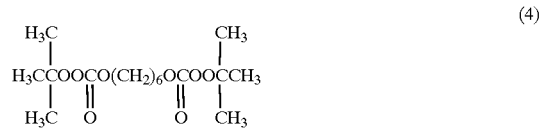   (4)

or the formula (5):

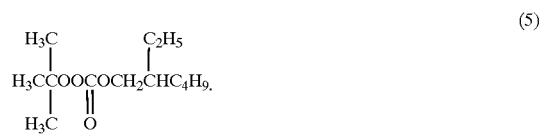   (5)

3. The fluorosilicone rubber composition of claim 1 wherein said co-crosslinking agent has in a molecule at least two substituents selected from the group consisting of allyl, acryloyl, methacryloyl and epoxy groups.

4. The fluorosilicone rubber composition of claim 1 wherein said co-crosslinking agent has in a molecule at least one alkoxy group and at least one substituent selected from the group consisting of allyl, acryloyl, methacryloyl and epoxy groups.

5. The fluorosilicone rubber composition of claim 3 wherein said co-crosslinking agent has at least two allyl groups in a molecule.

6. The fluorosilicone rubber composition of claim 3 wherein said co-crosslinking agent has at least two methacryloyl groups in a molecule.

7. The fluorosilicone rubber composition of claim 5 wherein said co-crosslinking agent is triallyl isocyanurate.

8. The fluorosilicone rubber composition of claim 1 wherein the silica filler (B) is present in an amount of 10 to 50 parts by weight.

9. The fluorosilicone rubber composition of claim 1 wherein the organic peroxide (C) is present in an amount of 0.2 to 2 parts by weight.

10. The fluorosilicone rubber composition of claim 1 wherein said co-crosslinking agent is selected from the group consisting of a compound of the following formulae:

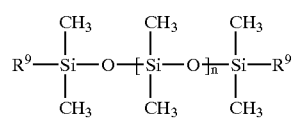

and

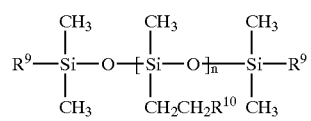

wherein, in the formulae, $R^9$ is a monovalent organic group of the following formula:
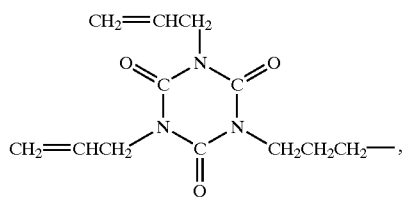
$R^{10}$ is a perfluoroalkyl group of 1 to 12 carbon atoms, and "n" is such a number as to give a molecular weight of up to 10,000.
11. The fluorosilicone rubber composition of claim 1 wherein said co-crosslinking agent is tetraallyl pyromellitate.
* * * * *